Nov. 25, 1969 D. J. ADDIS ET AL 3,480,924

HIGH SPEED THIN FILM MEMORY

Filed Jan. 26, 1967 2 Sheets-Sheet 1

INVENTORS:
DAVID J. ADDIS
WALTER R.J. BROWN &
MARTIN S. OSMAN,
BY Gordon Needleman
ATT'Y.

INVENTORS:
DAVID J. ADDIS
WALTER R.J. BROWN &
MARTIN S. OSMAN,
BY
ATT'Y.

United States Patent Office 3,480,924
Patented Nov. 25, 1969

3,480,924

HIGH SPEED THIN FILM MEMORY

David J. Addis, Swampscott, Walter R. J. Brown, Lexington, and Martin S. Osman, Newton, Mass., assignors, by mesne assignments, to United-Carr Incorporated, Boston, Mass., a corporation of Delaware Filed Jan. 26, 1967, Ser. No. 611,880
Int. Cl. G11b *5/00*
U.S. Cl. 340—174 4 Claims

ABSTRACT OF THE DISCLOSURE

This invention relates to the fabrication of a thin film memory utilizing electro-deposition techniques both for the memory elements and the terminating resistors on the word, sense and digit lines.

BACKGROUND OF THE INVENTION

In modern computers the trend has been toward high speeds for information retrieval which, in turn, requires an extensive amount of high speed memory capacity. The high speed computer memory which made the last decade of computer technology possible has the wired core memory. The wired core memory stores information by magnetizing a small ring or core of ferrite in one magnetic direction or another. Wires are woven through these cores and if an electric pulse is passed through the wires the direction of magnetism of the core can be determined and in this way the presence or absence of a bit of data is revealed. Recent advances in electric circuit design and fabrication have permitted much higher speeds in the arithmetic operations within computers. These speeds are now much faster than the speed with which the ferrite core memory can respond to the external magnetic field. If we make the ferrite cores smaller, we get an increase in speed of response but this, obviously, has a built-in physical limitation. Furthermore, due to the high speed of present day computers the pulses have extremely short rise times and are, therefore, difficult to transmit unless the transmission lines are of precisely known characteristics. The wires woven through the ferrite core memory have a characteristic impedance of about 200 or 300 ohms due to the fact that they form substantially an open wire transmission line and, as is well-known, this type of line cannot be made with reasonable wire sizes having the necessary low impedances.

Another difficulty in forming high speed memories is the necessity of matching the computer drive circuits to the memories that they must drive. Some form of complicated impedance transformation must occur in the transmission lines between the drive circuits and the core memory plane and also with the ends of the transmission lines which go through the cores. Once we have the very high impedances of an open wire line, it becomes very difficult to match these impedances from the drive circuits to the core memory plane and also to match impedances at terminations on other types of connections.

Deposited thin film high speed memories overcome most of these objections. The present forms of high speed thin film memories are fabricated by depositing a magnetic coating either by a vacuum evaporation or sputtering technique onto a glass or ceramic substrate. Glass or ceramic is required in these techniques owing to the vacuum within which the process must be carried out and in many cases vacuum deposition methods require fairly high temperatures which are beyond those that can be sustained by most plastic materials. After deposition, the glass or ceramic piece with the magnetic film upon it is mounted into a supporting frame. This frame is usually plastic and problems occur because the brittle, ceramic piece is supported by the more flexible, temperature and humidity-expansive plastic frame. The wires carrying the drive and sense signals are generally etched on a thin printed circuit board and pressed in contact with the evaporated metal film. The ends of these wires on the printed circuit board must then be terminated in some sort of a connector at each end so that they may be connected to the computer circuits on one end and to matching loads on the other. Owing to the differences in the physical characteristics of the ceramic or glass substrate carrying the magnetic films, the plastic support frame and the printed circuit board carrying the drive and sense leads, considerable difficulty is encountered in interconnecting these three parts electrically and mechanically.

It is important that the drive and sense lines be placed close to the surface of the deposited metal film or the signal strength will be very low and variable. Consequently, backing plates and other types of supports are generally used to press the circuit board into contact with the magnetic films. The circuit board is made very thin so that the distance between the conductors on one side, the side away from the magnetic film, are as close as possible to the surface of the deposited magnetic film on the other side. Unfortunately, the conductor on the back side of the circuit board can never be very close to the film, owing to the thickness of available printed circuit board material in general. It is difficult to use printed circuit board materials of thicknesses less than .005", although some attempts have been made to use somewhat thinner materials. As a consequence, the conductor on the side away from the magnetic film is farther from the magnetic film than the designer would normally like. The proposed present design of a high speed, magnetic, thin film memory overcomes substantially all of these objections and provides a simple, economical, reliable structure.

SUMMARY OF THE INVENTION

This invention is directed at a computer memory formed of electrodeposited elements. It is also directed at a new and unique resistor for use with computer memories, or the like.

DESCRIPTION OF THE PREFERRED EMBODIMENT

Figure 1:
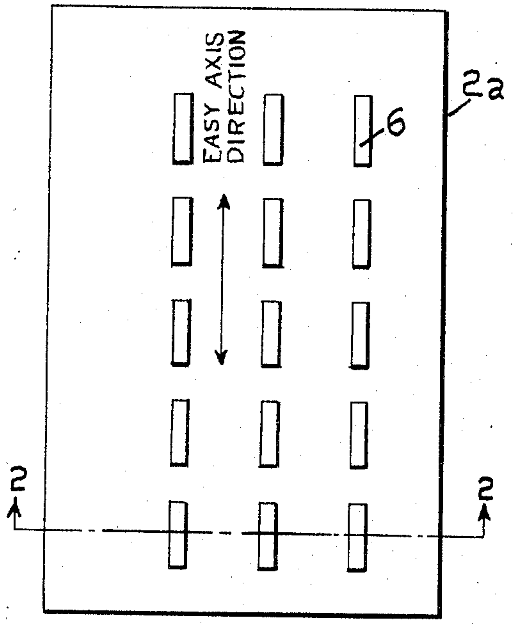
FIG. 1 is a top plan of a metallic surface with the memory bits deposited thereon.
Figure 3:
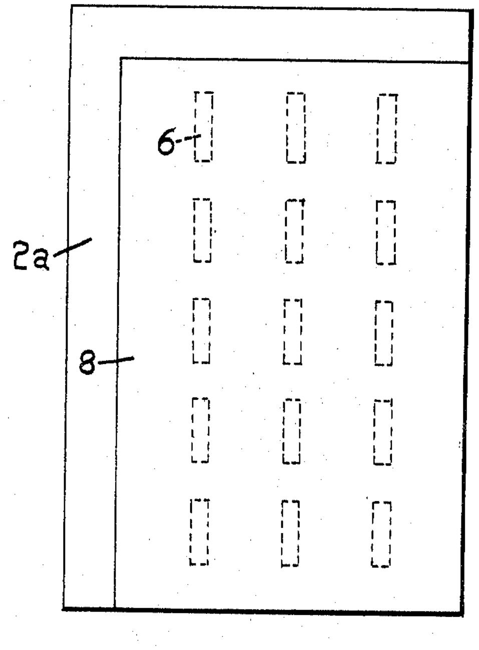
FIG. 3 shows an insulating overlay on the memory bit.
Figures 2, 4:
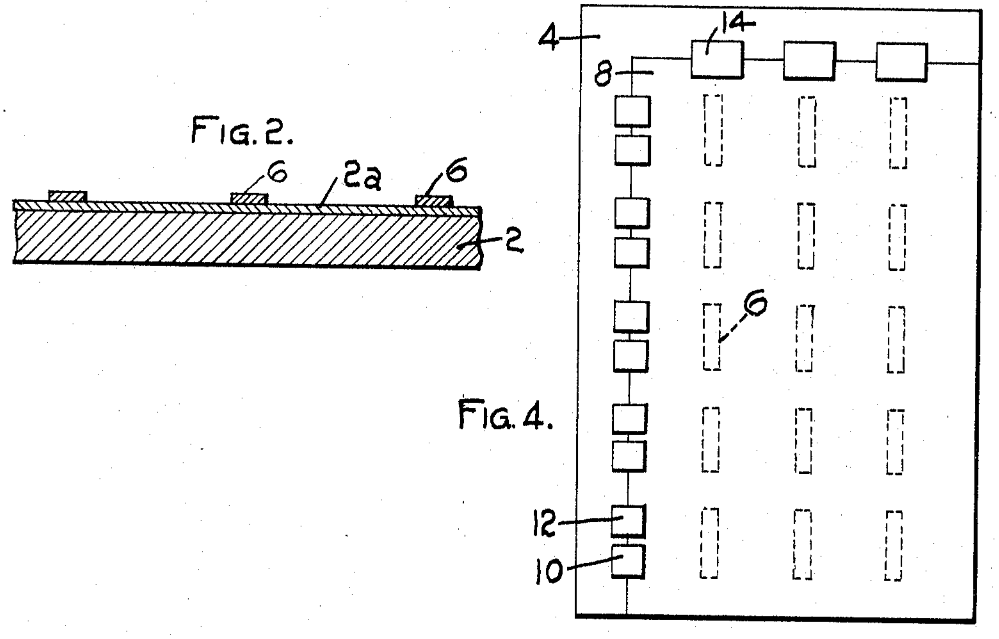
FIG. 2 is a section taken on line 2—2 of FIGURE 1.
FIG. 4 shows the result of deposition of resistor film material.

In the drawings there is shown a method of preparing a thin film computer memory commencing with a supporting substrate 2, for our purposes rectangular in configuration having a polished metallic surface, or a solid metal substrate, on which a magnetic film is chemically or electro-chemically deposited in a magnetic field. This magnetic film layer is of nonmagnetostrictive nickel-iron. The magnetic domains or bits, can be formed into a desired configuration by pattern plating, or by plating and selective etching of the deposited magnetic film layer, as shown in FIGURE 1, the nickel iron memory bits being numbered 6. The easy axis is shown to be horizontal in FIGURE 1. A predetermined area of the board is now coated with a thin insulating plastic material forming an insulating layer 8. This insulating layer 8 is rather thin, approximately .0002 to .0005 inch. A border of the ground plane 4 is left exposed on this side as shown in FIGURE 3. A series of resistors formed of a nickel phosphorous are electrolessly deposited with a portion of the resistor on the first insulating layer 8, and the remaining portion of the resistor on the ground plane 4. Along the left-hand border there is a series of pairs of resistors, each pair comprising a sense line resistor 10, and a digit line resistor 12. The resistors along the other border comprise a series of load or word line resistors 14. The resistors 10, 12, and 14 are formed to provide matching terminators, if desired, to the impedance of the transmission lines which will be deposited in a phase to be explained hereinafter. Normally several thousand resistors are formed in a single operation.

Figure 5:
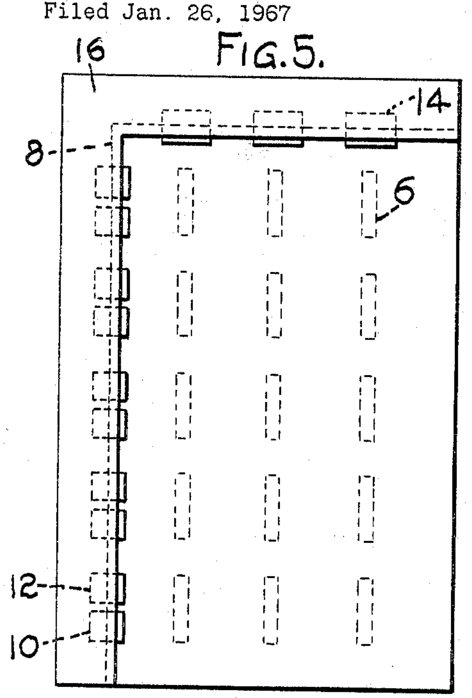
FIG. 5 shows the result of the deposition of a second insulating layer.

A second insulating layer 16, is placed over the exposed ground plane 4, and over approximately two thirds of each resistor, leaving a portion of the resistor exposed as shown in FIGURE 5. We have in effect by this step produced three areas in the resistor. A first area which is exposed and lies on the first insulating area; a second area which is located on top of the first insulating layer 8, but is covered by the second insulating layer 16; and a third area which makes contact with the ground plane 4, and is covered by the second insulating layer 16.

Figure 6:
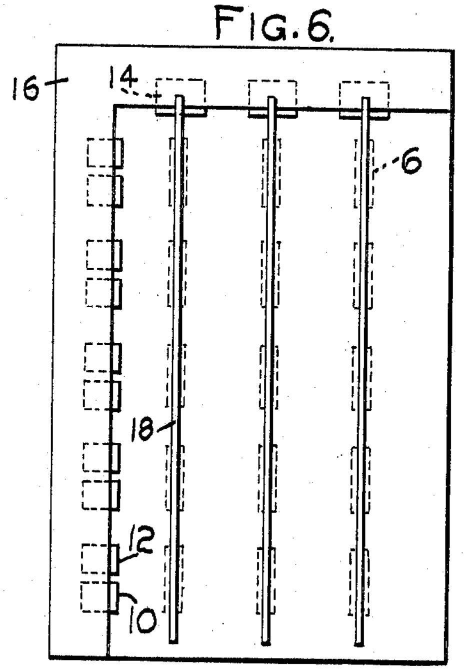
FIG. 6 shows the memory after deposition of the word lines.

A series of word lines 18, are then deposited on the first insulating layer 8, extending horizontally on top of the exposed portion of the load resistors 14, and slightly beyond onto the second insulating layer 16 as shown in FIGURE 6. Although the word lines 18, extend over and beyond the exposed surface of the load resistor 14, electrically the line stops at the separation between the second insulating layer 16, and load resistor 14, because that small portion which extends onto the second insulating layer 16, is not electrically connected to the load resistor 14, thus avoiding the necessity of extreme precision in engaging the word line 18 to its load resistor 14.

Figure 7:
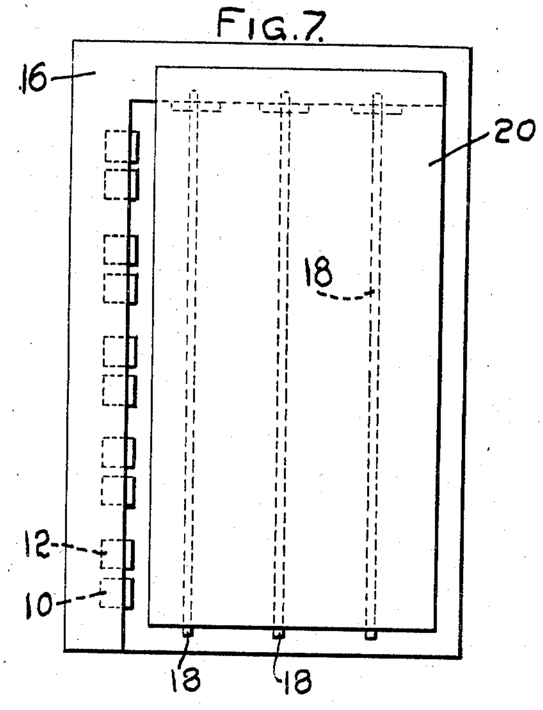
FIG. 7 shows the memory after deposition of the crossover layer.
Figure 8:
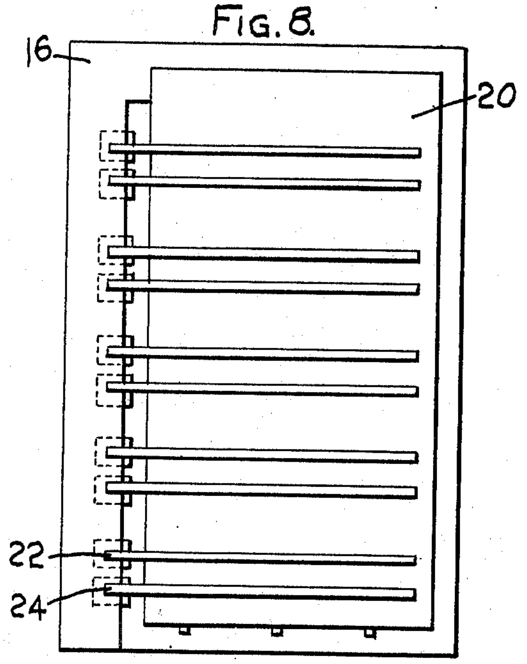
FIG. 8 shows the memory after deposition of digit and sense lines.

A crossover layer 20, is then deposited covering the word lines 18, and the exposed portion of the load resistors 14. However, a portion of the word lines 18, are allowed to remain exposed as shown in FIGURE 7 so that they may be formed to engage word line terminations in the future. A pair of transmission lines, one a digit line 22, and the other a sense line 24, are placed on top of the crossover layer 20, at right angles to the word line 18, with the digit lines 22, having a portion engaged with the digit line resistor 12, and the sense line 24, engaging a sense line resistor 10, as shown in FIGURE 8.

It is comparatively easy with a structure of the type disclosed herein to obtain low characteristic impedances needed to properly match the memory to a processing device. Another advantage of this fabrication technique is that the memory frame module can be directly connected into standard edge connectors for easy installation and removal. Reliability is also high in modules formed by this technique because there are no welded or soldered joints.

Normally the ends of all the drive and sense line terminating resistors would be connected together and grounded to the electrical ground of the computer. This assumes that the computer transmits its signals, using a microstrip-line transmission system. The microstrip-line transmission is used within the memory module itself. If other signal transmission systems are used in a computer, then a matching interface is required. This is usually not too difficult to do in that the characteristic impedance of the transmission line from the memory module can be made equal to the characteristic impedance of the transmission lines used within the computer itself.

With reference to the foregoing description it is to be understood that what has been disclosed herein represents only a single embodiment of the invention and is to be construed as illustrative rather than restrictive in nature and that the invention is best described by the following claims.

What is claimed is:

1. A thin film computer memory comprising a substrate having a conductive surface, said conductive surface having a series of magnetic bits thereon, a first insulating layer being superposed in abutting relationship on a portion of said conductive surface and on said magnetic bits, the remaining portion of said conducting surface providing a delineated area thereof, a series of sheet resistor elements superposed on said first insulating layer and on said delineated area, said resistors providing terminations for a series of transmission lines.

2. A thin film computer memory as set forth in claim 1 wherein a second insulating layer is in superposed butting relationship with said delineated area of said conductive surface, and is in superimposed butting relationship with a portion of each of said sheet resistor elements.

3. A thin film computer memory as set forth in claim 2 wherein each of said transmission lines is in superposed butting relationship with a portion of its sheet resistor element.

4. A thin film computer memory as set forth in claim 3 wherein the engagement of said transmission line with said sheet resistor element occurs in a portion thereof whose bounderies are defined by said first insulating layer and said second insulating layer.

References Cited

UNITED STATES PATENTS 3,219,984 11/1965 Bingham et al. ______ 340—174

TERRELL W. FEARS, Primary Examiner

S. B. POKOTILOW, Assistant Examiner